May 22, 1923.

E. LUUKKONEN

PITCHFORK

Filed Nov. 1, 1921

1,456,455

WITNESSES

INVENTOR
Eric Luukkonen
BY
ATTORNEYS

Patented May 22, 1923.

1,456,455

UNITED STATES PATENT OFFICE.

ERIC LUUKKONEN, OF NEW YORK, N. Y.

PITCHFORK.

Application filed November 1, 1921. Serial No. 512,030.

*To all whom it may concern:*

Be it known that I, ERIC LUUKKONEN, a citizen of Finland, and a resident of the city of New York, borough of Manhattan, in the county and State of New York, have invented a new and Improved Pitchfork, of which the following is a full, clear, and exact description.

This invention relates to pitch forks and has for an object to provide an improved fork wherein the tines may be removed and replaced at any time.

Another object of the invention is to provide a fork for farm use wherein the tines are rigidly held in place but so formed as to be easily removed and new ones substituted at any time so as to readily replace worn or broken tines.

In the accompanying drawing—

Figure 1:
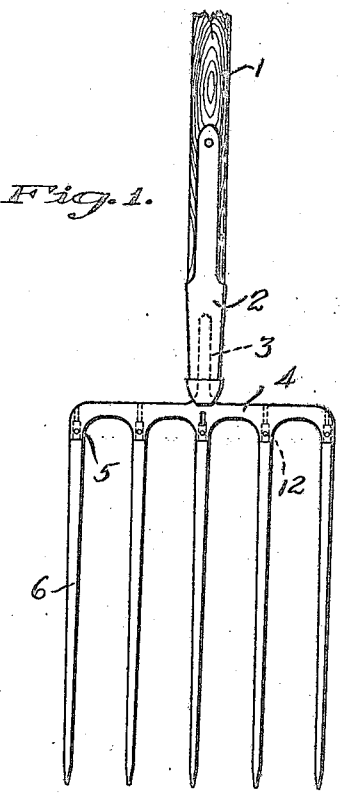
Figure 1 is a front view of a fork disclosing an embodiment of the invention, part of the handle being broken away.
Figure 2:
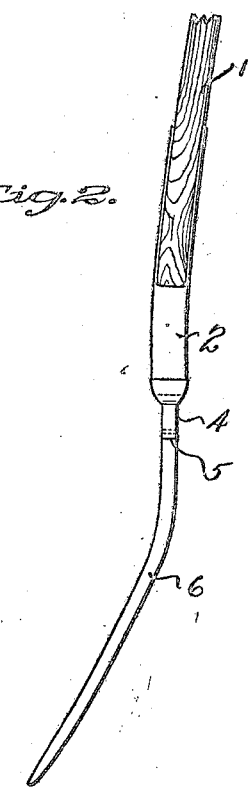
Figure 2 is an edge view of the structure shown in Figure 1.
Figure 3:
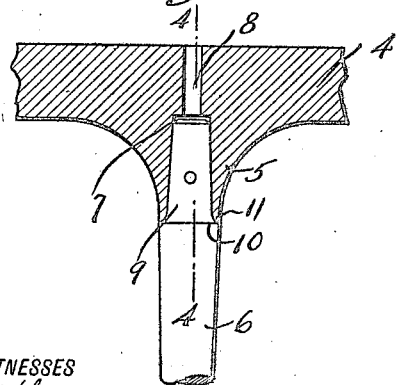
Figure 3 is an enlarged fragmentary view partially in section, showing the shank of a tine and a socket structure for receiving the same.
Figure 4:
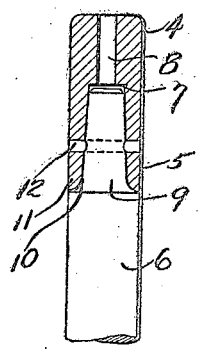
Figure 4 is a sectional view through Figure 3 on line 4—4.

Referring to the accompanying drawing by numerals, 1 indicates a handle of any desired kind, as for instance, wood, said handle being fitted into a socket 2 also of any desired or preferred structure. The socket 2 is adapted to receive the shank 3 which is an integral extension of the cross bar 4, said shank, if desired, extending into the end of the wood handle 1. The cross bar 4 is provided with a number of extensions 5, there being one extension for each of the tines 6. Each extension 5 is provided with a tapering socket 7 into which merges a bore 8 extending through the bar 4. Each of the tines 6 is provided with a tapering shank 9 merging into a rounded shoulder 10 fitting against the shoulder 11 while shank 9 fits tightly into the socket 7. A pin 12 extends through the extension 5 and through the shank 9 for positively locking the shank and tine 6 in place. The pin 7 is preferably upset or riveted at the ends so as not to become accidentally dislodged. However, this pin is usually of comparatively soft material. as for instance, iron, brass or copper whereby it may be easily drilled out and then the shank 9 removed. This is done when the tine has become worn or broken.

In forks of this kind used on the farm and elsewhere for moving hay and other articles, it often happens that one or more tines become broken. This causes the fork to be unbalanced and, consequently, to be more or less unwieldy. When one or more tines become broken in the ordinary pitch fork now in use, the fork is so worthless that it is usually thrown away. A fork constructed according to the present invention may have all the tines removed and new ones substituted or where there is only one tine broken, that particular one may be removed and a new one substituted. In this way, the breaking of a tine is not as great a misfortune with a fork constructed according to the present invention as if it was solid throughout.

It will be noted that when removing the shank 9, a small instrument may be inserted into the bore 8 for driving out the shank 6 which is usually wedged in very tight.

What I claim is :—

In a pitch fork of the character described, a cross-bar provided with a plurality of sockets each presenting at the front thereof an annular rounded shoulder, each of said sockets being in line with a bore extending through the cross-bar to the side opposite the side of the sockets, a tine having an end shaped to fit in said socket and presenting a shoulder to mate with the shoulder of the socket arranged therein, said bore being adapted to receive a tool for ejecting from the socket said tine when a change of the same is desired.

ERIC LUUKKONEN.